United States Patent [19]

Bianchi et al.

[11] Patent Number: 4,718,747
[45] Date of Patent: Jan. 12, 1988

[54] OPTICAL FIBER AND CABLE WITH HYDROGEN COMBINING LAYER

[75] Inventors: Giuseppe Bianchi, Milan; Laura Gherardi, Monza; Pietro Anelli, Milan; Marco Santini, Monza, all of Italy

[73] Assignee: Societá Cavi Pirelli S.p.A., Milan, Italy

[21] Appl. No.: 723,901

[22] Filed: Apr. 16, 1985

[30] Foreign Application Priority Data

Apr. 27, 1984 [IT] Italy ................. 20700 A/84
Apr. 27, 1984 [IT] Italy ................. 20699 A/84

[51] Int. Cl.$^4$ ............................................... G02B 6/44
[52] U.S. Cl. ............................. 350/96.23; 350/96.29
[58] Field of Search ............. 350/96.23, 96.10, 96.34, 350/96.24, 96.29, 96.30; 356/432

[56] References Cited

U.S. PATENT DOCUMENTS 4,661,320  4/1987  Ito et al. ................. 356/432

FOREIGN PATENT DOCUMENTS

| 34670 | 9/1981 | European Pat. Off. | 350/96.29 |
| 3236395 | 4/1984 | Fed. Rep. of Germany | 350/96.23 |
| 1365 | 4/1982 | PCT Int'l Appl. | 350/96.29 |
| 1543 | 5/1982 | PCT Int'l Appl. | 350/96.29 |
| 2052092 | 1/1981 | United Kingdom | 350/96.29 |
| 2125180 | 2/1984 | United Kingdom | 350/96.29 |

OTHER PUBLICATIONS

Noguchi et al., Electronics Letters, 20(21), 11 Oct., 1984, "Hydrogen Quantity Generated from Optical-Fibre Coating", pp. 897-898.

Primary Examiner—William L. Sikes
Assistant Examiner—Frank González
Attorney, Agent, or Firm—Brooks, Haidt, Haffner & Delahunty

[57] ABSTRACT

An optical fiber structure in which there is at least one layer around the fiber signal transmitting core, such layer being formed of, or containing a powder of, a hydrogen gas absorbing metal or metals from Groups III, IV, V or VIII of the periodic table, or alloys or intermetallic compounds of such metals, to absorb hydrogen and for protecting the core with respect to hydrogen absorption. Also, an optical fiber cable comprising at least one optical fiber and a sheath around the optical fiber or fibers. The cable comprises such a gaseous hydrogen absorbing metal or metals, or alloys or intermetallic compounds of such metals, to absorb the hydrogen for such purpose. The metal or metals may be in the form of metal films inside or outside the sheath, in the form of longitudinal wires within the sheath, part of tapes wound around the fiber or fibers or in the form of metal powders dispersed in the sheath or in a filler within the sheath. The cable includes a central elongation resistant wire which may, at least at its surface, be made of such metal or metals.

25 Claims, 12 Drawing Figures

OPTICAL FIBER AND CABLE WITH HYDROGEN COMBINING LAYER

The present invention relates to the protection of an optical fiber with respect to the absorption of gaseous hydrogen, particularly, when the optical fiber is incorporated within a cable and used to transmit telecommunication signals.

The absorption of hydrogen has adverse effects on the properties of an optical fiber, amongst which effects are the increased attenuation which results following the exposure of the fibers themselves to gaseous hydrogen and a degradation in the mechanical properties of the fiber.

In cables comprising one or more optical fibers, there is found, at times, a deterioration in the transmission properties of the fibers if the fibers are subjected to the action of hydrogen however such gas is generated, e.g. by members which are either outside or inside the cable. In actual fact, even the mechanical characteristics of the fiber are modified by such hydrogen although, as a rule, the macroscopic effects of increased attenuation are the first to become apparent. In fact, the fibers affected by hydrogen show an increase of attenuation for the wavelengths higher than 1 micron, i.e. at the wavelengths utilized for transmitting the signals.

Generally, the optical fibers comprise a glass structure formed with a cladding and a core of the "step index", or "graded index" type, but they may have even other structures, and a primary coating is applied to the fiber immediately after its formation, for the purpose of preventing the fiber from having any direct contact with the outside environment. Over said primary coating, there are applied other protective coatings, for example, constituted by a layer of silicone rubber and by a more rigid layer or tube made, for example, of nylon.

An optical fiber cable generally comprises one or more optical fibers, enclosed in a sheath, together with one or more traction-resistant members. Said sheath, which can either be metallic or not, is, in its turn, surrounded by other mechanical members such as armorings, coverings etc.

Tests which have been carried out have demonstrated that a primary cause of attenuation in the optical fibers incorporated in a cable is constituted by the hydrogen which, once it becomes diffused inside the fiber, is capable of absorbing energy in a spectrum comprising the wavelengths utilized for the optical signals.

Under particular conditions, this phenomenon is reversible, and the attenuation can even be considerably reduced if it is possible for the hydrogen to diffuse towards outside the fiber, for example, due to a lowering of the outside concentration of hydrogen which caused the phenomenon.

On the other hand, in other cases, it has been possible to establish that a second cause of attenuation must be attributed to chemical reactions taking place between the main constituents of the fiber, for example, $SiO_2$ and/or its dopants $GeO_2$, $P_2O_5$, etc., and the hydrogen which are contained inside the fiber itself.

The result of these reactions is the formation of groups containing the hydroxyl radical (OH) which are responsible for the absorption at the wavelengths which are also used for the transmission of signals. These latter reactions are irreversible, and hence, there is a corresponding deterioration of the fiber properties which can be expected under all conditions of use.

The parameters which control these phenomena are, apart from the chemical composition of the fiber, the partial pressure of the hydrogen to which the fiber is exposed, the temperature and, of course, time.

The fiber can come into contact with the hydrogen generated inside the cable, either during the cable manufacturing process, or else during the operation of the cable itself. As a matter of fact, the hydrogen can be generated by metallic or non-metallic members present in the cable which have absorbed said gas during the manufacturing, treating or finishing processes for the material forming the cable.

The hydrogen can also be generated because of the eventual chemical degradation, through the oxidation, of the organic materials forming the cable, or else through the reaction of the water, either in a liquid state or as vapor and eventually present in the cable, with the metallic members of the cable included in the cable structure.

Certain organic materials used in the fiber cladding, are capable of producing hydrogen due to chemical reactions of various natures. It has been found that one hydrogen source is constituted by the protective coatings themselves, and in particular, when the protective coating is the silicone rubber. As a theory, it is assumed that when the cross-linking process is prolonged in duration, there is a liberation of hydrogen at the fiber surface. The spreading of the hydrogen takes place towards the fiber, as well as towards outside of the protective coating but does not cause any appreciable pheonomena on the outside of the coating because, in this case, the hydrogen becomes dispersed in the surrounding environment.

Nevertheless, when the fiber is situated within a closed cable and without there being sufficient free space around the fiber, the hydrogen concentration can achieve relatively high values which cause its appreciable diffusion, even towards the fiber itself, aided by the fact that the cladding, from which the hydrogen is developed, is very near to the fiber.

The diffusion of the hydrogen through the various materials varies with the material and is the lowest with metals but increases, successively, with polymers, liquids and gases. Hence, depending upon the type of cable and upon the environment wherein it is utilized, there may be several rates for the emission of the hydrogen produced by the cable members. Therefore, there also are diverse rates of absorption, on the part of the cable, of the hydrogen eventually produced outside it and which permeates the operating ambient. The value of the partial pressure of the hydrogen inside the cable depends on these various rates and is a function of the time, because the greater the pressure and the duration are, the greater the level of risk for the fibers will be.

In general, it is necessary, in each case, to take into consideration a detailed balance of the production rate of the hydrogen (either originating inside or outside of the cable), the diffusion rate of the hydrogen through the cable sheath and finally, the spreading rate of the hydrogen through environmental means, for the purpose of establishing what partial hydrogen pressure will be, during a transient period and eventually in a steady state condition, in proximity to the cable fibers.

Given the service lifetime of an optical fibers cable, under foreseeable temperature conditions, the diffusion rate of the hydrogen through metals is so low that metallic sheaths of a normal thickness can be considered as being practically impermeable to the hydrogen. In particular, the cables having metallic sheaths, especially if they have a small space inside them, are cables which have, in a short time and at high levels, increases in attenuation due to the hydrogen which is liberated from the elements inside of the sheath.

One object of the present invention is to provide an optical fiber which is protected against the absorption of gaseous hydrogen which may be present in the cable containing the fiber. Such protection is obtained, according to the invention, by providing around the outermost layer of the fiber itself, one or more coatings containing metals which are capble of combining with the hydrogen and which form a barrier in correspondence to said coating.

According to the invention, an optical fiber, having at least one protective coating, is characterized by the fact of including, in at least one of said protective coatings, one or more metals of the Groups III, IV, V, VIII of the periodic system as a protection against the absorption of gaseous hydrogen on the part of the fiber.

Another object of the present invention is to provide an optical fiber cable provided with a protection against the absorption of gaseous hydrogen by the optical fibers round in the cable.

This protection is obtained, according to the invention by introducing, in a suitable form into the cable, at least one metallic element that is capable of absorbing the hydrogen and combining with it.

The optical fiber cable according to the invention, comprising a sheath inside which there is housed at least one optical unit comprising one or more optical fibers, is characterized by the fact of having, inside of said sheath, one or more metals of the Groups III, IV, V and VIII of the periodic system, as a protection against the absorption of gaseous hydrogen by the optical fibers.

The metals which have provied to be particularly suitable are lanthanides for Group III; titanium, zirconium and hafnium for Group IV; vanadium niobium and tantalum for Group V; and palladium for Group VIII, in the form of pure metals, their alloys or intermetallic compounds.

In the presence of hydrogen, the identified elements tend to form solid interstitial solutions which are similar to hydrides having a good stability, and this allows for a reduction in the partial hydrogen pressure in the cable to values which counterbalance the solubility of the hydrogen in the members themselves.

By utilizing appropriate quantities of these elements, one can succeed in limiting the residual pressure values of hydrogen in the cable, in such a way as to render negligible the adverse effects of said hydrogen pressure on the fiber properties and in particular, upon their increases of attenuation throughout the entire foreseen service life of the cable.

Preferably, the identified elements are subjected to a thermal treatment, under vaccum, at temperatures of some hundreds of degrees centrigrade, e.g. over 1600° C., prior to being utilized in cable production, for the purpose of eliminatiī.ȝ any hydrogen which may have been absorbed, and/ɔr the combined oxygen. In fact, it has been verified that after said treatment, the described elements become more active in absorbing hydrogen, particularly at low partial pressure values.

It is assumed that these elements can, in some cases, already contain a certain quantity of hydrogen and/or other gases that were absorbed during the manufacturing, purification and finishing processes of the elements themselves and that they have a certain level of superficial oxidation. Both these phenomena could reduce the efficacy of the protection against the hydrogen, and the thermal treatment at temperatures that are approximate to, but less than the melting temperature, provide a degasification and/or the elimination of the superficial oxidation through sublimation.

Other objects and advantages of the present invention will be apparent from the following detailed description of the presently preferred embodiments thereof, which description should be considered in conjunction with the accompanying drawings in which.

Figure 1:
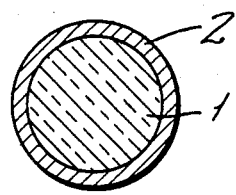
FIG. 1 is a schematic cross-section of an optical fiber provided with a primary metallic coating of the invention.

With reference to FIG. 1, an elementary optical fiber comprises a glass portion 1 of any type whatsoever, i.e. "step index", "graded index" or other types, and a primary coating 2 adjacent and contacting the portion 1, the coating 2 having the function of protecting the fiber from the outer environment.

According to a first embodiment of the invention, the glass portion 1 is protected by a metallizing layer formed by one or more of the materials described. Said layer can constitute the primary coating 2 shown in FIG. 1 in close contact with the glass structure of the optical fiber. Thus, there is obtained a fiber where the primary coating is of the metallic type and which, at the same time, performs the mechanical function as well as the function of safeguarding against the absorption of hydrogen by the environment surrounding the fiber, during operation.

Figure 1A:
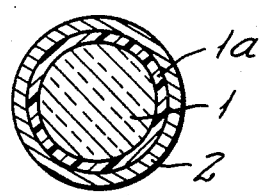
FIG. 1a is a schematic cross-section of an optical fiber provided with a metallic coating of the invention around a primary coating on the fiber.

According to a variation shown in FIG. 1a, the metallizing layer 2 is applied immediately over the usual primary coating 1a made of cross-linked resin. This construction is utilizable whenever it is not possible or convenient to modify the plant for producing the fiber so that the protective coating is applied immediately after drawing the optical fiber to the desired dimensions.

As a further variation, the coating 1a may be one or more coatings described hereinafter.

Figure 2:
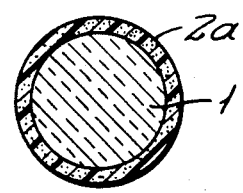
FIG. 2 is a schematic cross-section of an optical fiber provided with a primary insulation-metal powder coating of the invention.

In accordance with a further embodiment, illustrated in FIG. 2, the primary coating 2a, made of acrylic resin or of some other suitable material, contains a dispersion of the powders of one or more of the cited metals, or their alloys or intermetallic compounds. This permits the incorporation of the protective coating in a conventional manufacturing process.

Figure 3:
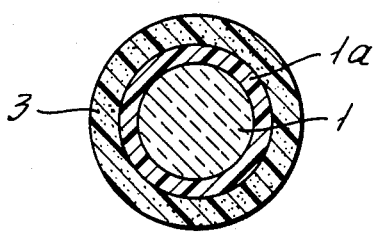
FIG. 3 is a schematic cross-section of an optical fiber provided with a primary coating and a secondary coating of the invention.

A further embodiment (FIG. 3) adds the metallic powders to the resin coating 3 immediately surrounding the primary covering 1a. This coating 3 is typically made of silicone rubber and, as explained previously, silicone rubber can become a particularly dangerous source of hydrogen. The presence of the metals in this coating 3 effectively neutralizes the hydrogen which is generated, even before it can diffuse towards the fiber.

Figure 4:
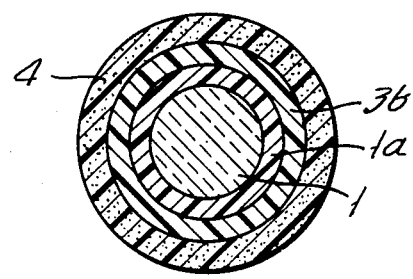
FIG. 4 is a schematic cross-section of an optical fiber provided with a primary coating and a secondary coating of the invention, between which there is interposed a cushioning layer.

The optical fiber illustrated schematically in FIG. 4, is a further embodiment of the invention which has a dispersion of metallic powders in the secondary coating which is constituted, for example, out of nylon or some other thermoplastic polymer.

In the embodiments described, the particles of the powders have dimensions which are, preferably, less than 10 microns, and the quantity of the powders per length unit of the optical fiber is selected to achieve a concentration within the range of from 0.1 to 10 phr (parts per hundred of resin) in the resin. The range of 0.1–10 phr is preferred, but can vary depending on the thickness of the coating. The metal content of the coating should be at least 0.01 g./m.

It must be kept in mind that the protective function, according to the invention, is accomplished in various ways, depending upon the coating in which the metals are incorporated. More precisely, the presence of a protective layer very close to the optical fiber, protects the latter mainly against the hydrogen generated in the innermost protective coatings, while an outer protective coating, for example, around the silicone rubber, provides mainly a protection from the hydrogen derived from the cable elements.

In view of what has been stated, as other factors dedepending upon the structure and the foreseeable conditions of operation of the cable, it will be apparent that the several previously described different embodiments can be combined in a same optical fiber.

Figure 5:
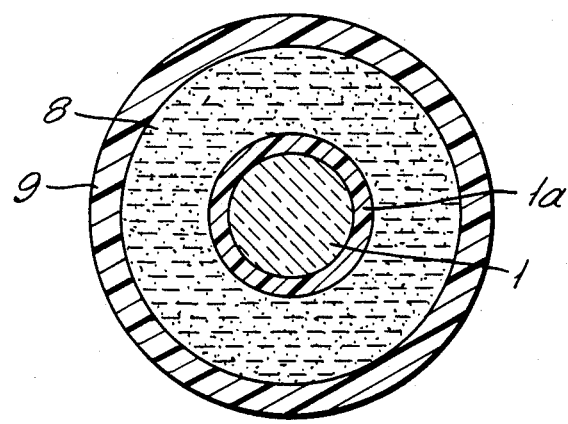
FIG. 5 is a schematic cross-section of a coated optical fiber loosely enclosed by a small tube, the space between the tube and the fiber being filled with a gel containing metal powder according to the invention.

A further embodiment of the invention, which is illustrated in FIG. 5, comprises an optical fiber 1 having a primary coating 1a enclosed by a small tube 9 of plastic material, the inner diameter of which is greater than the outer diameter of the fiber 1. The fiber 1 may be provided with the usual coatings for constituting an optical fiber of the loose type. For this type of fiber, which may have non-adherent coverings, the protection can be realized by having coatings such as those described previously and/or by providing inside the small tube 9 a gel 8 containing a dispersion of powders of the described metals or their alloys or intermetallic compounds.

As an alternative, combined or not with the immediately preceding embodiment, the material that constitutes the small tube 9 may contain a dispersion of powders of the described metals or of their alloys or intermetallic compounds.

Figure 6:
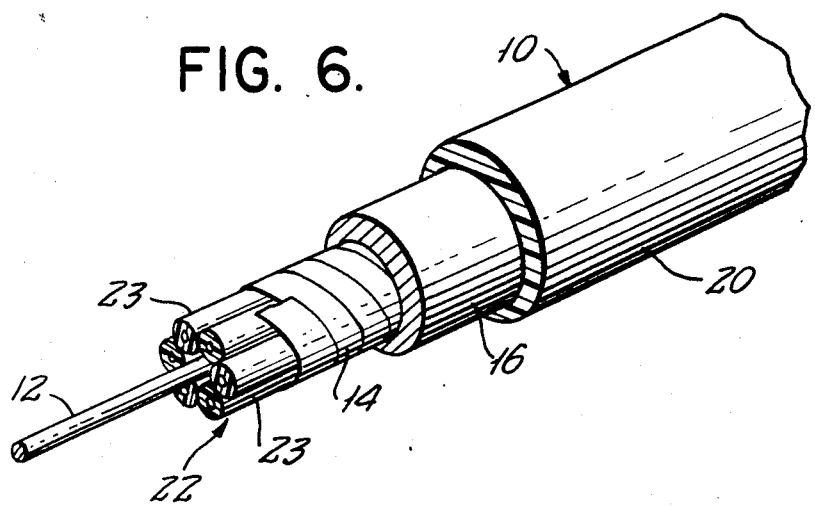
FIG. 6 is a schematic, perspective view illustrating the structure of part of an optical fiber cable which may include the invention.

The optical fiber cable 10 shown schematically in FIG. 6 comprises an optical unit 22 formed by six optical fibers 23 laid on a traction-resistant member 12 and covered by one or more tapes 14. The optical unit 22 is contained inside a sheath 16, over which there are provided other layers, coverings and various structures, depending upon the type of cable, which is schematically illustrated by the layer 20.

The sheath 16 can be an impermeable metallic sheath, for example, of a submarine cable, or else a sheath of plastic material. Inside, the sheath 16 there can be contained a filler having a mechanical function, e.g., a non-vulcanized thermoplastic compound of ethylene-propylene or polyvinylchloride or a waterblocking filler, such as petroleum jelly or a silicone grease which may include a swelling agent, such as carboxymethylcellulose, etc.

The optical unit 22 can comprise longitudinal supporting traction-resistant members different from the member 12, and the fibers can either be of the "loose" type or the "tight" type, i.e., loosely enclosed by a covering or covered with a layer tightly engaging the fiber. In view of this, the illustration given in FIG. 6 is to be understood as being only general and schematic and is given only for the purpose of facilitating the understanding of the invention.

Figure 7:
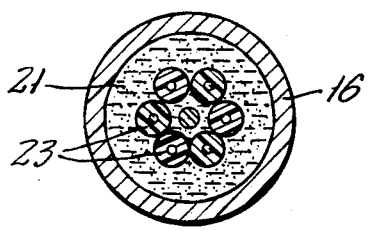
FIGS. 7 to 11, schematically show cross-sections of the inside of optical fiber cables including various embodiments of the invention.

According to a first embodiment, illustrated in FIG. 7 and which is particularly suited for protecting a cable already containing a filler 21 for the purpose of limiting any eventual penetration of water in a submarine cable, the filler material 21, which occupies the space within the outer sheath 16 (that can be in the order of about 5 $cm^3$ per meter of cable) which are not occupied by fibers and other elements, contains a dispersion of powders of one or more elements of the Groups III, IV, V and VIII of the periodic system, amongst which lanthanum, titanium, zirconium, hafnium, niobium, tantalum and palladium, their alloys and/or intermetallic compounds, are preferred.

The quantity of powders introduced into the filler material 21 depends upon the type of cable, upon its geometry and upon the element (or elements) selected from those described and of which these powders are constituted, upon their shape and upon the size of the granules.

In the case of a cable having a water-blocking filler underneath a metallic sheath of normal dimensions, e.g. 5–20 mm. depending upon the number of optical fibers enclosed by the sheath, it has been found, for example, that a quantity of between 10 and 100 mg of palladium in powder form per meter of cable and having particles with dimensions of between, for example, 10 and 100 microns, preferably, 30–50 microns, is sufficient for protecting the fibers against the hydrogen quantities and pressures which develop in this type of cable.

It must be pointed out here that the filler to which the powders are added does not necessarily have to be the waterblocking filler of a submarine cable. The cable could already have a filler for other purposes, for example, for making the structure more compact and to which the powders are added later, or else, as an alternative, the cable could originally be devoid of a filler, and in such case, the filler would be added expressly for including the powders.

Figure 8:
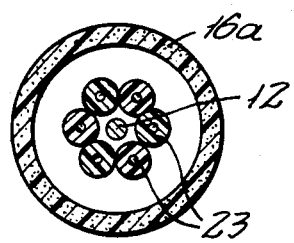

In a second embodiment shown in FIG. 8, the cable comprises at least one outer, elastomeric or plastomeric sheath 16a inside which are dispersed the powders of one or more elements of the Groups III, IV, V and VIII of the periodic system, preferably, lanthanum, zirconium, hafnium, vanadium, niobium, tantalum or palladium, or their alloys and/or intermetallic compounds.

The size of the dispersed powders is, in this second embodiment, reduced (on the order of a few microns) with respect to the previous embodiment. This second embodiment, which is particularly suitable for protecting optical fiber cables which are devoid of an outer metallic sheath and which are used in environments having a high hydrogen content, requires the adoption of mixtures having, for example, at least 0.1 phr (parts per hundred of resin) of palladium in the production of said outer sheath. A range of 0.1–10 phr is preferred, and the palladium should be at least 0.01 g./m. of cable length.

Figure 9:
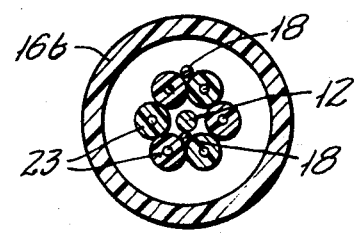

In a third embodiment (FIG. 9), the cable comprises one or more wires 18 formed, at least at the exterior, by one or more elements of The Groups III, IV, V, VIII of the periodic system, preferably, lanthanum, titanium, zirconium, hafnium, vanadium, niobium, tantalum or palladium, or one of their alloys and/or their intermetallic compounds. The wire or wires 18 can form the traction-resistant member (12 in FIG. 6) or else one of the components of the traction-resistant member, and in such cases the fibers are helically disposed around it. As an alternative, said wire 18 can be added to the members which are already found present in the cable as shown in FIG. 9.

This embodiment is particularly suited for cables having a large inner free space between the elastomeric sheath 16b and the fibers 23, for example, on the order of about 50 cm³ per meter of cable, and it requires, in case the metal used in palladium, a wire having a diameter in the range of from 0.02 to 0.2 mm in order to protect the fibers against the action of the hydrogen in the quantities and at the pressures that are developed in this type of cable.

Since the absorption phenomenon involves only the outer surface of these metals, the wires can be made from other materials and coated externally by a layer of the described metals which is thick enough, e.g. 0.02 to 0.2 mm, to provide the desired results. In this case, the diameter of the wires are obviously different.

Figure 10:
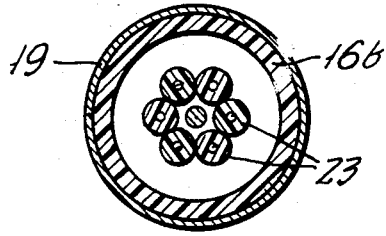

FIG. 10 illustrates a further embodiment whereby the protecting members are obtained by means of a coating or film made from one or more of the described metals (or their alloys and/or intermetallic compounds) disposed around the optical unit or units. In the cable of FIG. 10, the outer surface of the sheath 16b is metallized with a film or coating 19. As already stated, such film or coating 19 may be one or more of the metals cited and/or their alloys or intermetallic compounds.

The choice of the metallic combination utilized depends upon various factors amongst which are the cost involved, the efficacy of the metal in absorbing hydrogen, the availability of the metal, its workability, etc. However, in the case of certain combinations, the pheonomena of an improved efficacy has been noted, in particular, for a mixture of niobium and zirconium which is used in the form of wires, or as a metallization layer. The excellent performance of this mixture is probably due to the fact that, apart from both of these metals being hydrogen absorbers, zirconium combines very easily with oxygen, thereby protecting the niobium. An alloy of niobium and zirconium in which the zirconium content is 15–25% by weight is preferred, but other compositions, such as an alloy having equal parts by weight of niobium and zirconium may be used with good results.

Figure 11:
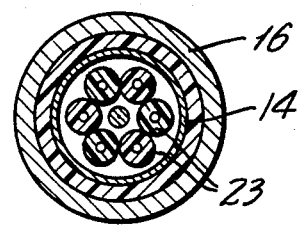

According to a fifth embodiment, illustrated in FIG. 11, the cable comprises a layer or film 14 of at least one of the already cited elements and/or their alloys and/or intermetallic compounds, applied on a tape of plastic, or else a metallic tape, for example, steel, Al, Cu, etc.,), or metal-plastic laminated tape, for example, aluminum covered with polyethylene, which provides a wrapping 14 for the optical cable unit 2.

This embodiment, which is particularly suitable for protecting cables which can be attacked by an external source of hydrogen, requires a thickness for a palladium layer which is in the range of from 1 to 20 microns for tapes which are wound, at short pitch, over an optical unit having the usual dimensions, e.g. 8–10 mm. in diameter, to obtain the protection of the fiber under the normally foreseen conditions of use. With other metals, particularly metals not in Group VIII, the tape thickness should be greater.

In the case of external sources of hydrogen, it is preferable for the active layer to face outwardly.

In the various embodiments, the content of the metal selected from one of the Groups III, IV, V and VIII depends upon the amount of hydrogen which it is expected will be released or generated during the life of a cable containing the fiber. Therefore, the metal content depends on such things as cable size, materials, treatments, environment, etc. It is desirable to keep the hydrogen partial pressure content within the cable below 1–2 mm. Hg. The metal content should be the minimum amount determined to be necessary plus a small additional amount for safety reasons. The upper limit of the metal content depends upon cost and the effect of the metal content on the physical properties of a coating incorporating the metal in powder form.

Palladium is a preferred metal because it can be used in smaller amounts. Although other metals are less expensive, the niobium content, for example, should be of the order of ten times, by weight, the palladium content and the zirconium content, for example, should be of the order of one hundred times by weight, the palladium content.

The content of palladium should not be less than 10 mg/m. of cable. A preferred range is between from 15 to 150 mg./m of cable. Preferably, the palladium particle size is not greater than 10 microns when the material in which it is admixed is nylon to avoid significant alteration of the physical properties of the layer. This latter considerations apply when other metals are used.

It must be understood that the various embodiments illustrated herein are not incompatible with one another and that they can, in fact, co-exist and be rendered advantageously complementary in a same cable.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An optical fiber structure comprising an optical signal transmitting core surrounded by at least one protective layer, wherein the improvement comprises including in at least one of the protective layers at least one gaseous hydrogen absorbing powder of a metal selected from Groups III, IV, V and VIII of the periodic system for protecting the core with respect to the absorption of gaseous hydrogen.

2. An optical fiber structure as set forth in claim 1 wherein said powder of said metal is present in said one of the layers in an amount at least equal to 0.01 g./m. of length of the fiber.

3. An optical fiber structure as set forth in claim 1 wherein said metal is selected from the group consisting of lanthanides, titanium, zirconium, hafnium, vanadium, niobium, tantalum, palladium and mixtures, alloys and intermetallic components thereof.

4. An optical fiber structure as set forth in claim 1 or 3 wherein said one of the layers is in contact with said core.

5. An optical fiber structure as set forth in claim 1 or 3 wherein there is a further protective layer intermediate said one of the layers and the core.

6. An optical fiber structure as set forth in claim 1 or 3 wherein said one of the layers comprises said powder of said metal admixed with a resin.

7. An optical fiber structure as set forth in claim 6 wherein the particle size of the particles of said powder is not greater than 10 microns and said powder is present in an amount which is in the range from 0.1 to 10 parts per hundred of the resin.

8. An optical fiber structure as set forth in claim 7 wherein said one of the layers is in contact with the core.

9. An optical fiber structure as set forth in claim 7 wherein there is a further layer intermediate said one of the layers and said core.

10. An optical fiber structure as set forth in claim 9 wherein said resin is silicone rubber.

11. An optical fiber structure as set forth in claim 7 wherein there are two further layers intermediate said one of the layers and said core.

12. An optical fiber structure as set forth in claim 1 or 3 wherein said powder of said metal is dispersed in a gel.

13. An optical fiber structure as set forth in claim 12 wherein said gel is surrounded by a tube.

14. An optical fiber structure as set forth in claim 1 or 3 further comprising a further protective layer around said core and wherein said powder of said metal is around said further protective layer and said powder is surrounded by a tube.

15. An optical fiber structure as set forth in claim 1 or 3 wherein one of the protective layers is a sheath.

16. An optical fiber structure as set forth in claim 15 wherein the inner wall of said sheath is spaced from the optical fiber or fibers and said powder is intermediate said sheath and said optical fiber.

17. An optical fiber structure as set forth in claim 16 wherein one of the protective layers is a filler intermediate said sheath and the optical fiber or fibers and wherein the metal powder is dispersed in said filler.

18. An optical fiber structure as set forth in claim 15 wherein said sheath is made of a plastic material and said metal powder is dispersed in said plastic material.

19. An optical fiber structure as set forth in claim 1 or 3 in which a protective layer is a tape around the core and said powder forms at least part of a tape.

20. An optical fiber structure as set forth in claim 19 wherein said tape comprises a plastic material.

21. An optical fiber structure as set forth in claim 2 wherein said metal is selected from the group consisting of lanthanides, titanium, zirconium, hafnium, vanadium, niobium, tantalum, palladium and mixtures, alloys and intermetallic components thereof.

22. An optical fiber cable comprising a plurality of optical fibers surrounded by a sheath and at least one metal wire within said sheath which extends longitudinally of said optical fibers, and a protective layer around said fibers, said protective layer being formed, at least in part, of at least one gaseous hydrogen absorbing metal selected from Group VIII and subgroup b of Groups III, IV, V of the periodic system for protecting the optical fiber or fibers with respect to the absorption of gaseous hydrogen.

23. An optical fiber cable as set forth in claim 22 further comprising an elongation resistant member within said sheath and extending longitudinally of the optical fiber or fibers.

24. An optical fiber cable as set forth in claim 23 wherein said plurality of the optical fibers are disposed around an axis extending longitudinally thereof and wherein said elongation resistant member is disposed at said axis.

25. An optical fiber cable as set forth in claim 22 wherein said metal wire is an elongation resistant member and said metal selected from said Group VIII and subgroup b of Groups III, IV, V is at least at the surface of the wire.

* * * * *